United States Patent [19]

Rogers

[11] Patent Number: 5,579,377
[45] Date of Patent: Nov. 26, 1996

[54] REMOTE-CONTROL TELEPHONE ANSWERING SYSTEM AND METHOD

[76] Inventor: Laurence S. Rogers, 15 Aspen Rd., Scarsdale, N.Y. 10583

[21] Appl. No.: 342,093

[22] Filed: Nov. 18, 1994

[51] Int. Cl.⁶ ...................................................... H04M 1/64
[52] U.S. Cl. ................................. 379/74; 379/67; 379/77; 379/88
[58] Field of Search ................................. 379/67, 88, 89, 379/74, 76, 77, 377, 380, 381, 382, 350, 351, 283, 160, 165, 102, 177

[56] References Cited

U.S. PATENT DOCUMENTS

| | | | |
|---|---|---|---|
| 3,729,589 | 4/1973 | Bonsky et al. | 379/81 |
| 4,514,593 | 4/1985 | Hattori et al. | 379/80 |
| 4,578,540 | 3/1986 | Borg et al. | 379/200 |
| 4,584,434 | 4/1986 | Hashimoto | 379/100 |
| 4,596,900 | 6/1986 | Jackson | 379/77 |
| 4,682,353 | 7/1987 | Inoue et al. | 379/163 |
| 4,720,853 | 1/1988 | Szlam | 379/211 |
| 4,737,981 | 4/1988 | Hoberman et al. | 379/112 |
| 4,742,538 | 3/1988 | Szlam | 379/361 |
| 4,785,473 | 11/1988 | Pfeiffer et al. | 379/89 |
| 4,794,637 | 12/1988 | Hashimoto | 379/67 |
| 4,899,378 | 2/1990 | Hamer | 379/374 |
| 4,941,166 | 7/1990 | Waldman et al. | 379/67 |
| 4,998,272 | 3/1991 | Hawkins, Jr. et al. | 379/88 |
| 5,027,393 | 6/1991 | Yamamura et al. | 379/410 |
| 5,050,160 | 9/1991 | Fuda | 370/32.1 |
| 5,146,489 | 9/1992 | Telibasa | 379/100 |
| 5,267,305 | 11/1993 | Prohs et al. | 379/233 |
| 5,339,354 | 8/1994 | Becker et al. | 379/67 |
| 5,341,415 | 8/1994 | Baron | 379/201 |
| 5,400,393 | 3/1995 | Knuth et al. | 379/88 |
| 5,422,937 | 6/1995 | Ferrara | 379/88 |
| 5,432,844 | 7/1995 | Core et al. | 379/67 |
| 5,481,596 | 1/1996 | Comerford | 379/67 |
| 5,483,579 | 1/1996 | Stogel | 379/88 |
| 5,487,102 | 1/1996 | Rothschild et al. | 379/67 |

FOREIGN PATENT DOCUMENTS

| | | | |
|---|---|---|---|
| 58-148556 | 9/1983 | Japan | 379/74 |
| 62-11352 | 1/1987 | Japan | 379/74 |
| 64-848 | 1/1989 | Japan | 379/77 |
| 2-062148 | 3/1990 | Japan | 379/77 |

OTHER PUBLICATIONS

Hagans, Mike et al., "Part-68 Interface," *Electronics Now*, May 1993, pp. 56–58, 71.

Black, Thomas E., "Build A Telephone Line Simulator," *Popular Electronics*, Jan. 1995, pp. 31–39, 90.

"Signal Control for Message Recording", J. T. Holloway et al., IBM Technical Disclosure Bulletin vol. 15, No. 12, May 1973, pp. 3854.

*Primary Examiner*—Krista M. Zele
*Assistant Examiner*—Scott L. Weaver
*Attorney, Agent, or Firm*—Fish & Neave; Laurence S. Rogers

[57] ABSTRACT

A controller circuit enables remote control of conventional answering machines from any DTMF-capable telephone coupled to the same telephone line to which the answering machine is coupled, and within the same dwelling (such a telephone is referred to as a "local remote-control" telephone). The controller is coupled between the answering machine and the telephone line, and in a first mode of operation is transparent to the answering machine. When activated by a DTMF security code transmitted from a local remote-control telephone, the controller enters a second (local remote-control) mode of operation. The controller in this second mode causes the answering machine to pick up the line as if answering a call. DTMF signals transmitted by the local remote-control telephone are coupled by the controller to the answering machine for enabling remote control of the machine (e.g., to retrieve recorded messages). The controller also reduces the magnitude of supervisory tones and audio messages transmitted onto the telephone line from a Central Office while the local remote-control telephone is off-hook retrieving messages from the answering machine, to minimize interference between these signals and retrieved messages being heard through the local remote-control telephone. A version of the controller may be embodied within an improved telephone answering machine to provide local remote-control capabilities.

16 Claims, 4 Drawing Sheets

REMOTE-CONTROL TELEPHONE ANSWERING SYSTEM AND METHOD

This invention relates to an improvement for a telephone answering machine. More particularly, the invention relates to a method and apparatus for enabling a telephone answering machine to be coupled to a telephone line at substantially any location within a dwelling (residence or office), and to be accessed from and controlled by a conventional telephone coupled to the same telephone line at a remote location within the dwelling.

BACKGROUND

Telephone answering machines are well known. A typical consumer telephone answering machine is a stand-alone device coupled to a telephone line at a single location, and in parallel with one or more telephones coupled to the telephone line at the same or other locations. This type of answering machine typically includes circuitry for (1) detecting a ringing signal on the telephone line indicating the presence of an incoming telephone call, (2) answering the call by taking the line off-hook, (3) playing an outgoing or "greeting" message, (4) recording an incoming message, and (5) hanging up the line (going back on-hook) in order to respond to a subsequent telephone call. The greeting and incoming recorded messages typically are recorded in the analog domain using one or more conventional audio tapes. Answering machines of this type also are known in which either or both of the greeting and incoming messages are recorded instead in the digital domain using RAM or other storage device.

In addition to the foregoing, stand-alone answering machines commonly include circuitry for enabling remote-control operation of various ones of the machine's functions (e.g., playback of recorded messages, fast forwarding and rewinding of recorded messages, recording a new greeting message, and so forth). Such remote-control operation typically relies on the use of a conventional dual-tone multi-frequency (Touchtone®, or "DTMF") telephone (or DTMF-tone generating device) remotely located off of the premises at which the answering machine is located. Typically, such remote-controlled answering machines include circuitry for detecting DTMF signals generated by or from the remote telephone, and circuitry for responsively controlling the answering machine's operations. To guard against unauthorized access to recorded messages, a remote user typically must first transmit to the answering machine a sequence of DTMF signals, indicative of a predetermined security code, before the machine will respond to remotely generated DTMF command signals. An example of such a stand-alone, remote-controlled answering machine is the model TAM-50, available from Sony Corporation. There are many other examples of similar answering machines on the market.

Other types of answering machines, called "voice mail" systems, are also well known. Voice mail systems serve a plurality of users each having his or her own individually controlled and accessible "voice mailbox." Each voice mailbox may be accessed from substantially any other remotely located telephone, either within or without the dwelling. Because of their ability to service multiple users, voice mail systems are found typically in offices and other commercial environments to provide a centralized telephone answering and messaging function. While once very expensive and thus found only in commercial settings, voice mail systems today may be found small office or even residential environments having an IBM or IBM-compatible personal computer ("PC"). PC-based voice-mail systems typically comprise a circuit card placed in an expansion slot of the computer that in turn is coupled to one or more telephone lines via "ports" on the card.

Even though stand-alone telephone answering machines exist that may be remotely-controlled, as described above, known machines suffer from a common problem. This problem is that remote-control operation may be achieved only by dialing into the machine from another telephone coupled to another telephone line within or without the dwelling in which the answering machine is located. That is, known stand-alone telephone answering machines may not be remotely controlled by another telephone coupled to the same telephone line within the dwelling. As a result, whenever it is desired to obtain messages from the answering machine (for instance, while at home), it is necessary to go to the answering machine to play back recorded messages or otherwise control its operation using the machine's control panel. At best, this is inconvenient.

One advantage that voice-mail telephone answering machines have over stand-alone telephone answering machines, when coupled to a PBX or to a Key Telephone System, is that voice-mail messages may be retrieved by remote control from substantially any telephone within or without the dwelling in which the voice-mail machine is located. This capability exists because the PBX or Key Telephone System is placed in effective series between the dwelling's telephone lines and the public telephone network, and controls (i.e., can prevent) access to the network (also called, herein, Central Office Lines). Thus, a PBX or Key Telephone System allows dialing from one telephone extension within a dwelling to another (such as to the voice-mail system to retrieve recorded messages) without interference from signals sourced from the telephone network (because the extensions in use for retrieving voice-mail messages are not coupled at that time to the telephone network).

While PBX or Key Telephone voice-mail systems work very well, a problem with such an approach to implementing a telephone answering function is that it is expensive. Moreover, because a PBX or Key Telephone System approach to implementing a telephone answering function requires placing circuitry in series between the public telephone network and the telephones (extensions) within the dwelling, such a system can be inconvenient or difficult to install (particularly in a house or apartment).

SUMMARY OF THE INVENTION

In view of the foregoing, it would be desirable to provide an improvement for a telephone answering machine (either stand-alone or voice-mail) that allows the machine to be coupled to a telephone line within a dwelling at substantially any location along the line, and remotely controlled (including to play back recorded messages) from another telephone that is coupled within the dwelling to the same telephone line in parallel with, but at a location remote from, the answering machine.

It would further be desirable to provide such an improvement for a telephone answering machine that allows the answering machine to be remotely controlled from another telephone coupled to the same telephone line within the same dwelling without having to place a telephone call to the machine from another telephone line.

It would still further be desirable to provide such an improvement for a telephone answering machine that allows the machine to be remotely controlled from within the same dwelling, but without having to be coupled to a PBX, to a Key Telephone System.

It would additionally be desirable to provide such an improvement for a telephone answering machine to allow the machine to be remotely controlled from another telephone coupled to the same telephone line within the dwelling, but without having to place any circuitry or other device in series between the telephone line and a public telephone network for controlling access to the network from the telephone line.

These and other objects of the present invention are provided by a novel controller for use with or incorporation within an otherwise conventional, remote-control telephone answering machine. The controller has two modes of operation. In a first mode, the controller enables the answering machine to operate as it normally would, and as if the controller were not present. Thus, in the first mode, the answering machine monitors the telephone line for incoming telephone calls placed from another telephone line. Upon detecting the presence of a ringing signal, the answering machine takes the line "off-hook" to answer the call, optionally plays a greeting message, records an incoming message, hangs up the line, and resets itself to await another call. In this first mode of operation, the answering machine's operation also may be remotely controlled in a conventional manner by DTMF signals transmitted by the telephone placing the call from the second telephone line. This type of remote control—in which remote operation is achieved by transmitting DTMF tones from a telephone coupled to a second line calling into the answering machine—is hereinafter referred to as "remote remote-control."

In a second or "local remote-control" mode of operation, the controller enables the answering machine to be remotely controlled by DTMF tones transmitted by substantially any telephone coupled to the same telephone line to which the answering machine is coupled, and within the same dwelling (such a telephone is herein referred to as a "local remote-control" telephone). This local remote-control mode of operation is entered when circuitry within the controller detects that (1) a local remote-control telephone has gone off-hook at time when no incoming call has been or is being received, and (2) a predetermined DTMF security code sequence has been received from the local remote-control telephone. Upon this occurrence, the controller transmits a synthesized ringing signal to the answering machine to which the controller is coupled, to cause the answering machine to go off-hook to "answer" the "call." Once the machine has answered by picking up the line, it may be remotely controlled by DTMF signals transmitted from the local remote-control telephone just as if those signals were being transmitted from a remote remote-control telephone coupled to a second telephone line calling into the telephone line to which the answering machine is coupled. Thus, messages may be played back to the local remote-control telephone without having to place a telephone call to the answering machine from another telephone line. The local remote-control telephone may be placed at substantially any location along the telephone line, either remote from or adjacent to the location along the telephone line at which the answering machine is coupled (through the controller).

In order to prevent the DTMF security tones and commands used for controlling the controller and the answering machine from inadvertently causing the placement of an outgoing telephone call, the first DTMF signal sent to the answering machine (referred to herein as an "attention signal") should preferably be one which the Central Office recognizes to be invalid and incapable of placing a telephone call (such as "#" or "*"). To reduce interference from audio signals received from the Central Office (such as supervisory tones and pre-recorded messages) when the local remote-control telephone has been off-hook for a period of time without placing an outgoing telephone call, circuitry also is provided in the controller for substantially reducing or cancelling the magnitude of such interfering signals. This circuitry is arranged, however, so as to not substantially impair or degrade the audio signals representing messages being played back by the telephone answering machine that are heard through the local remote-control telephone, or DTMF control signals transmitted to the answering machine from the local remote-control telephone. The circuitry also allows DTMF tones still to be received by the controller and the answering machine even while the aforementioned audio messages are being reduced, to permit remote control by the local remote-control telephone.

The present invention may be implemented as a stand-alone device coupled between a conventional answering machine and a telephone line, in order to enable local remote-control of machines in which no such capability previously existed. Alternatively, the invention may be implemented within an answering machine to provide the machine with integral local remote-control capabilities.

BRIEF DESCRIPTION OF THE DRAWINGS

The above-mentioned objects and features of the invention can be more clearly understood from the following detailed description considered in conjunction with the following drawings, in which the same reference numerals denote the same structural elements throughout, and in which.

DETAILED DESCRIPTION OF THE INVENTION

Figure 1:
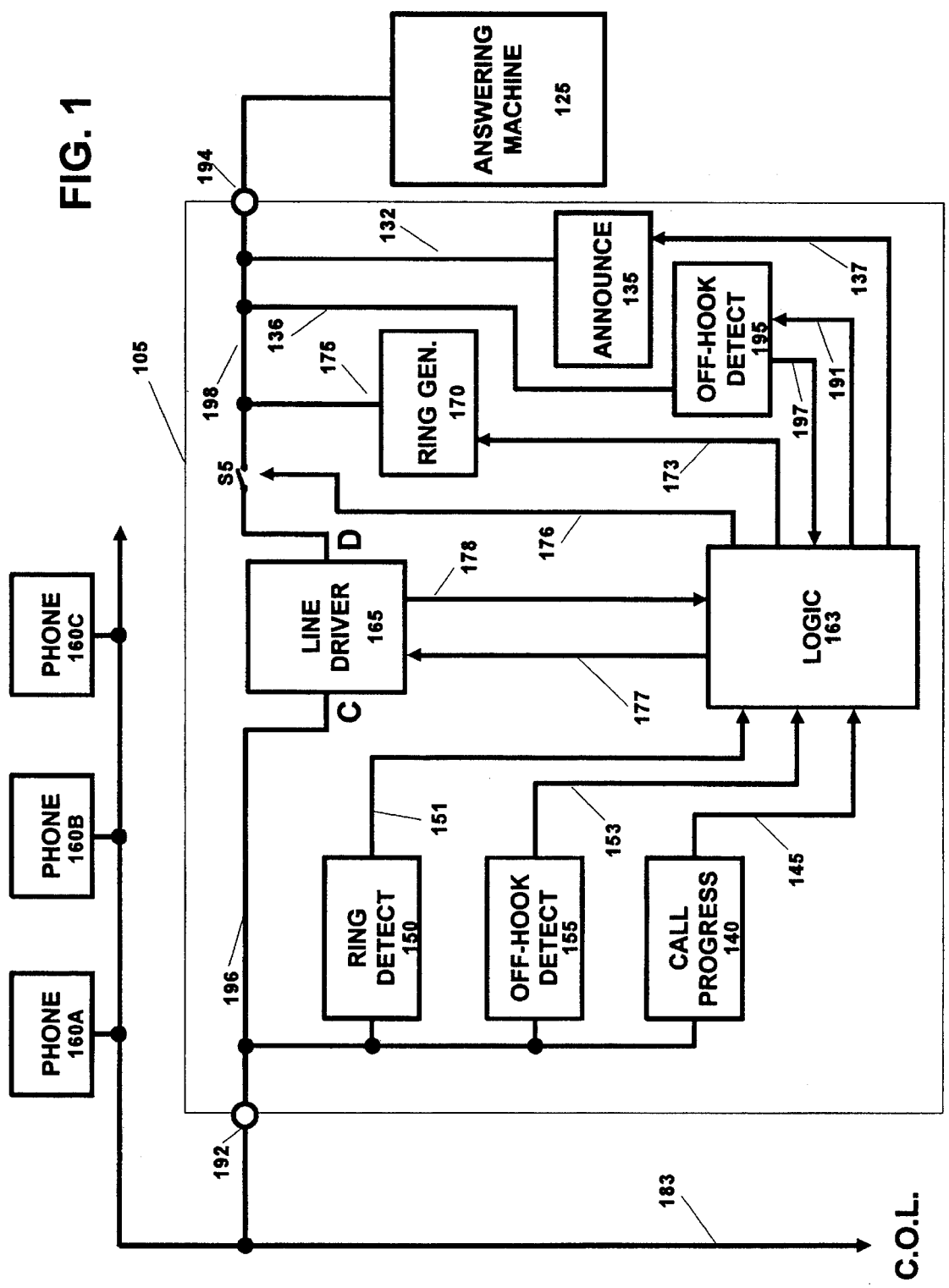
FIG. 1 is a block diagram of an exemplary embodiment of the controller of the present invention coupled between a telephone line and a conventional remote-controlled answering machine.

FIG. 1 is a block diagram of an exemplary embodiment of the invention in the context of a local remote-control adapter coupled between a telephone line and a conventional remote-controlled answering machine, to enable the answering machine to be controlled from any local remote-control telephone. As used herein, a local remote-control telephone is a telephone that is coupled to the same telephone line to which the answering machine is coupled, in parallel with the answering machine, and at a location along the telephone line that may be physically remote from the location at which the answering machine is coupled (e.g., in another part of or in a different room, or on a different floor).

As shown in FIG. 1, a conventional telephone line 183 (as might exist within any residential, commercial or other dwelling) is coupled to a Central Office via a public telephone network designated as a Central Office Line ("C.O.L.") (the telephone network is not shown in FIG. 1). Telephone line 183 is a two-wire telephone line characterized by Tip ("T") and Ring ("R") conductors (also not shown in FIG. 1). Also coupled to telephone line 183 are one or more local remote-control telephones 160A, 160B, 160C, etc., at least one of which is capable of transmitting DTMF tones (either directly, or using a DTMF generator coupled or held to the telephone). It will be appreciated by those skilled in the art that, while three telephones are shown in FIG. 1, one DTMF-capable telephone alone would be sufficient and substantially any plurality of two or more could be accommodated. Each of telephones 160A–160C may be located anywhere along telephone line 183.

Also coupled to telephone line 183 via terminal 192 (which may, for example, be a conventional RJ11 telephone coupler), and in parallel with the local remote-control telephones, is local remote-control circuit of the present invention. Coupled to another second terminal 194 (which also may be an RJ11 coupler) is answering machine 125. Answering machine 125 may be substantially any commercially available answering machine (stand-alone, or voice mail) that is capable of being remotely controlled by DTMF tones transmitted to it over the telephone line to which the machine is coupled. A non-limiting example of a remote-controlled answering machine suitable for use with the present invention is the aforementioned Sony model TAM-50. In this particular answering machine, remote-control operation is achieved by calling the telephone number to which the answering machine is attached from a telephone coupled to another telephone line (hereinafter called a "remote remote-control" telephone). When the answering machine picks up the line and commences playback of a greeting message, conventional DTMF signals may be transmitted to the machine from the remote remote-control telephone in the form of a predetermined answering machine security code. Upon recognizing this code, the machine enters a mode whereby remote-control operation of its various functions (e.g., recorded message playback, greeting message playback, record a new greeting, etc.) may be achieved by subsequent transmission to the answering machine of various combinations of DTMF commands.

While conventional answering machines of the foregoing type may be remotely controlled as described above, remote operation cannot be initiated from another telephone coupled to the same telephone line to which the machine is attached. That is to say, remote-control operation cannot be initiated from a local remote-control telephone. This is because placing the machine into its remote-control mode requires use of a telephone coupled to another telephone line to call the number of the telephone line to which the answering machine is attached, so that the machine picks up its line in response to the detection of a ringing signal on the line. Because of this limitation, a user within a dwelling desiring to retrieve messages from a conventional answering machine located within the same dwelling can do so in only limited ways. One way is to go physically to wherever the answering machine is located, in order to access the machine's control panel to retrieve recorded messages and otherwise to control its operations. Another way is to place a telephone call to the answering machine from a second telephone line within the dwelling, and to operate the machine remotely as if calling into the machine from outside the dwelling. Yet a third way is to use a PBX or Key Telephone System to implement at least two different lines (extensions), coupled through the PBX or Key Telephone System to two or more external (C.O.L.) telephone lines, and to call into the answering machine coupled to telephone line extension from another telephone line extension. None of these alternatives is fully satisfactory. The first way can be inconvenient. The second requires purchasing a second telephone number and line, and thus is expensive. In any event, the second way results in tying up both telephone lines simply to retrieve messages. The third way also requires purchase and installation of expensive equipment.

Controller 105 of the present invention solves the foregoing problems by enabling conventional answering machine 125 to be remotely controlled from any local remote-control telephone. Remote-control operation of the answering machine is achieved with the present invention using the machine's pre-existing remote-control capabilities, but without having to call into the machine from another telephone line. The invention thus allows the answering machine to be placed substantially anywhere within a dwelling, and to be readily accessed from anywhere else within the dwelling where a conventional telephone is located, using only one telephone line without a PBX or Key Telephone System.

All of this is accomplished, as shown in FIG. 1, by controller 105 coupled in series between telephone line 183 and answering machine 125. (Conventional circuitry to protect against telephone line spikes, transient, and polarity reversals and the like is not shown in the accompanying figures in order to avoid unnecessarily cluttering the disclosure.)

Controller 105 includes a first off-hook detect circuit 155 and a ring detect circuit 150 coupled to terminal 192 via line 196. Also shown coupled to terminal 192 is an optional call progress circuit 140. Off-hook detector 155 is a conventional circuit that detects when any local remote-control telephone (e.g., any of telephones 160A–160C) coupled to telephone line 183 has been taken off hook. Off-hook circuit 155 operates by detecting the DC voltage level on telephone line 183. When all telephones 160A–160C are on-hook, the DC voltage appearing across the T and R conductors of telephone line 183 is approximately 48V. However, when any of telephones 160A–160C is taken off-hook, the DC voltage across the T and R conductors drops to about 6V. Thus, when the voltage across telephone line 183 is low, off-hook detect circuit 150 indicates that telephone line 183 is off-hook by asserting a digital signal ("Off-Hook") on line 153. When the telephone line goes back on hook, off-hook detect circuit 155 de-asserts the Off-Hook signal. The off-hook signal is coupled, as shown in FIG. 1, to a first input of logic circuit 163 via line 153.

Ring detect circuit 150 operates to detect when a ringing signal is present on telephone line 183, to signify the presence of an incoming telephone call. Ring detect circuit 150 can be substantially any conventional circuit for accomplishing this function by detecting, in a well-known manner, the presence of a 20 Hz analog ringing signal on telephone line 183 and by responsively asserting a digital signal ("Ring") on line 151 when the ringing signal is present. The output of ring detect circuit 150 is coupled to logic circuit 163 via line 151.

Call progress circuit 140 detects, in a conventional manner, the presence on telephone line 183 of various supervisory call progress tones received from the Central Office and heard through telephones 160A–C. These call progress tones include, for example, audible dial, ringing, busy and re-order tones. When any of these call progress tones is present on the telephone line, it is detected by call progress circuit 140 which responsively asserts a digital signal indicative of the particular tone or tones detected. This signal is coupled to logic circuit 163 via line 145.

Also included within controller 105 is a ring generator 170, second off-hook detect circuit 195 and announcement circuit 135. Ring generator 170 includes an output coupled to line 198 of controller 105 via line 175, and a control input coupled to logic circuit 163 via control line 173. Ring generator operates, in a conventional manner, to synthesize and output on line 175 an analog 20 Hz tinging signal in response to a control signal received from logic circuit 163 over line 173. In order to prevent transmission of the synthesized ringing signal to telephone line 183 (which might cause one or more of telephones 160A–160C to ring as if in response to an incoming telephone call), controller 105 further includes a switch S5 coupled in series between the output of ring generator 170 and telephone line 183 (and line driver 165). Switch S5 is controlled, as described in more detail below, by a control line of logic circuit 163. Switch S5 preferably comprises a normally closed relay, although other types of switches (including solid-state transistor switches) may be used.

Second off-hook detect circuit 195, coupled to line 198, monitors the state of line 198 in order to detect, as further described below, when answering machine 125 has picked up the line by going off-hook. Off-hook detect circuit 195 is enabled by logic circuit 163 via line 191, and asserts an "Answering Machine Off-Hook" signal on line 197 coupled to an input of logic circuit 163.

Announcement circuit 135 is coupled to line 198 via output line 132, and is controlled by logic circuit 163 via control line 137. As further described below, announcement circuit 135 places various audible announcements onto line 198 for transmission to local remote-control telephones 160A–160C during operation of controller 105. Preferably, announcement circuit 135 comprises a conventional speech synthesizer circuit including a digital signal processor and memory programmed to enable the generation of various spoken messages indicative of different states of operation of controller 105. Alternatively or additionally, announcement circuit 135 may include a conventional tone generator for transmitting to telephones 160A–160C different tones indicative of different states of operation of controller 105.

Logic circuit 163 may be substantially any form of logic circuitry for controlling and synchronizing operation of the various circuits of controller 105 as described below. Logic circuit 163 may be comprised, as will readily understood by persons skilled in the art, of conventional NAND, NOR and other logic gates for synchronizing and controlling the aforementioned circuit modules and various functions described herein. Alternatively, logic circuit 163 may be comprised of a microprocessor conventionally programmed, as would be readily understood by persons skilled in the art, for carrying out the various operations to be described. However implemented, logic circuit 163 receives as inputs the Ring signal generated by ring detect circuit 150, the Off-Hook and Answering Machine Off-Hook signals asserted by circuits 155 and 195, and the call progress signals generated by call progress circuit 140. Logic circuit 163 further includes outputs for controlling ring generator circuit 170, switch S5, off-hook detect circuit 195 and announcement circuit 135, as well as inputs and outputs respectively coupled to line driver 165 via control lines 177 and data lines 178.

Line driver circuit 165 is coupled, as shown in FIG. 1, in series between telephone line 183 and answering machine 125. Line driver 165 includes two bidirectional ports C and D. As more fully discussed below, line driver 165 performs two principal functions. First, it enables any local remote-control telephone 160A–160C to remotely control the playback of recorded messages of answering machine 125 in order to retrieve those messages through that telephone.

Second, line driver 165 substantially reduces supervisory tones, audio messages and other audio signals transmitted by the Central Office to telephone line 183 while recorded messages are being played back through the local remote-control telephone, in order to reduce undesirable interference between those signals and the recorded message as heard through the telephone.

The apparatus of FIG. 1 operates as follows. Assume, initially, that each of telephones 160A–160C is on-hook and a ringing signal is not present on telephone line 183. In this default state, the outputs of ring detect circuit 150, off-hook detect circuit 155 and call progress circuit 140 are de-asserted (e.g., at a logical low). In response to these signals, logic circuit 163 via control line 177 causes line driver 165 between ports C and D to be bypassed, so that audio and DTMF signals pass essentially unaltered between ports C and D (as if line driver 165 were not present). In this default state, ring generator 170 is disabled and switch S5 is closed by control signals output by logic circuit 163.

With controller 105 in the default state as described above, if a telephone call is placed to telephone line 183 from another telephone line, a 20 Hz, high-voltage ringing signal transmitted from the Central Office will appear on telephone line 183. This ringing signal is detected by ring detect circuit 150, which asserts a logical "1" (Ring signal) to logic circuit 163 via line 151. The assertion of the Ring signal causes logic circuit 163 to maintain controller 105 in its default state in which: (1) answering machine 125 is coupled to telephone line 183 transparently through line driver 165, (2) ring generator 170 is maintained off, and (3) switch S5 is closed. If one of telephones 160A–160C is picked up to answer the call, or if answering machine 125 answers the call, off-hook detect circuit 155 detects that telephone line 183 has gone off-hook and asserts an Off-Hook signal to logic circuit 163 via line 153. Logic circuit 163 interprets the presence of the Off-Hook signal on line 153 concurrently with the presence of the Ring signal on line 151, or within a predetermined period of time (e.g., two seconds) after the cessation of the Ring signal on line 151, as an indication that an incoming telephone call was answered. Alternatively, logic circuit 163 determines that an incoming call was answered if the Off-Hook signal is asserted without the assertion within a predetermined period of time (e.g., one second) of a Dial Tone signal generated by call progress circuit 140 on line 145. Upon determining that an incoming call has been answered, logic circuit 163 continues to maintain line driver 165 in its default (bypassed) state, ring generator 170 off, and switch S5 closed.

When telephone line 183 goes back on-hook (as would occur when each of telephones 160A–160C is returned to its on-hook state following a telephone call, or when answering machine 125 hangs up the line in the event it answered the call), this is detected by off-hook circuit 155 and signalled to logic circuit 163 by the de-assertion of the Off-Hook signal on line 153. Logic circuit 163 continues to maintain switch S5 closed, and ring generator 170 off.

As thus far described, telephone line 183, telephones 160A–160C and answering machine 125 operate normally, and as if controller 105 were not there. Thus, in the default state of operation above-described, if DTMF tones appear on telephone line 183 (such as would occur if a remote remote-control telephone calling into telephone line 183 operated answering machine 125 by conventional remote control), these signals are ignored by controller 105.

In accordance with the present invention, controller 105 may enter a second (local remote-control) mode of operation in which any DTMF-capable local remote-control telephone 160A, 160B or 160C may remotely control answering machine 125 to retrieve recorded messages. In the preferred embodiment of FIG. 1, this second mode of operation is entered when: (a) any of telephones 160A–160C goes off-hook at a time when a ringing signal is not present on telephone line 183 (or, if optional call progress circuit 140 is used, when a dial tone is detected), and (b) a predetermined DTMF local remote-control security code (such as, for example, ###) is transmitted from the local remote-control telephone to controller 105 within a predetermined time period of the line going off-hook (as a security feature). When these events occur, the following signals are coupled to logic circuit 163: (1) the Ring signal output by ring detect circuit 150 is de-asserted (a logical "0"); (2) call progress circuit 140, if used, asserts a Dial Tone signal; (3) off-hook circuit 150 asserts the Off-Hook signal on line 151; and (4) line driver 165 outputs on line 178 data signals indicative of the DTMF security code transmitted by the local remote-control telephone. Upon receiving these inputs, and confirming that the proper security code has been received (within, e.g., five seconds of the line going off-hook), logic circuit 163 places controller 105 in its local remote-control mode, described below. Of course, if any of local remote-control telephones is taken off-hook and is used to initiate an outgoing telephone call, logic circuit 163 will maintain controller 105 in its default state (because no security code within the predetermined time period, and no dial tone, will be detected).

Upon entering local remote-control mode, logic circuit 163 opens switch S5, and then enables ring generator 170 to couple a synthesized analog ringing signal to line 198. (Additionally, logic circuit 163 enables optional announcement circuit 135 to transmit to the local remote-control telephone a message or audio signal—e.g., two distinctive beeps—indicating that controller 105 has entered its local remote-control mode.) The synthesized ringing signal is blocked by opened switch S5 from being coupled telephone line 183, but it is coupled to answering machine 125 via line 198 and terminal 194. The synthesized ringing signal causes answering machine 125 to "answer" the call by taking line 198 off-hook. This, in turn, is detected by answering machine off-hook detect circuit 195, which also was enabled by logic circuit 163 via control line 191 when switch S5 was opened via control line 176. Answering machine off-hook detect circuit 195 asserts an answering machine off-hook signal to logic circuit 163 via line 197.

Answering machine off-hook detect circuit 195 operates by impressing on telephone line 198, when switch S5 is opened, DC voltages corresponding to the different on-hook and off-hook voltages appearing on telephone line 183. Thus, when switch S5 is opened and before line 198 is picked up by answering machine 125, off-hook detect circuit 195 impresses 48V D.C. on line 198 to indicate to answering machine 125 that line 198 is on-hook. When answering machine 125 detects a ringing signal on line 198 (from ring generator 170), and picks up line 198, off-hook detect circuit detects this and causes the voltage on line 198 to drop to 6V DC indicative of the line being taken off-hook. By coupling these voltages onto line 198 corresponding to those appearing on telephone line 183, off-hook detect circuit 195 ensures that substantially any commercially available answering machine 125 will work properly with controller 105.

Upon receipt of the answering machine off-hook signal from circuit 195, logic circuit 163 turns off ring generator 170 and closes switch S5. In the event that answering machine 125 for whatever reason does not pick up line 198, logic circuit 163 after a predetermined number of rings disables ring generator 170, disables off-hook detect circuit 195, closes switch S5, and resets.

Also upon receipt of the answering machine off-hook signal, logic circuit 163 via control lines 177 enables line driver 165 between ports C and D. When enabled, line driver 165 couples message signals being played by answering machine 125 to telephone line 183 (from port D to port C), so that these messages may be heard through any of the local remote-control telephones 160A–160C. In addition, line driver 165 couples DTMF control signals transmitted by the local remote-control telephone to answering machine 125 (from port C to port D), in order to enable the machine's various operations to be remotely controlled. Thus, the user of the local remote-control telephone may transmit to the answering machine whatever security code or codes may be necessary to place the machine into a state by which it may be remotely controlled, and thereafter transmit whatever other DTMF command signals may be necessary in order to cause the answering machine to play back its recorded messages or otherwise to perform various desired ones of its remote-control functions. Line driver 165 accomplishes all of this while at the same time reducing undesirable interference with messages being played back in the local remote-control telephone caused by audio signals transmitted onto line 183 from the Central Office switched telephone network.

In the preferred embodiment, line drive 165 reduces this interference by substantially reducing the magnitude of supervisory tones, messages and other undesirable audio signals that appear on telephone line 183 as a result of transmissions from the Central Office. This is done, however, without substantially affecting the magnitude of message signals being transmitted onto telephone line 183 from answering machine 125. By reducing the Central Office signals, line driver 165 reduces interference that these signals cause with messages being played back by the answering machine and heard through the local remote-control telephone. Line driver 165 thus reduces Central Office interference without requiring circuitry to be coupled in series between the public telephone network and the telephone line to which the answering machine and local remote-control telephones are coupled.

After recorded messages have been retrieved from the answering machine, the local remote-control telephone will be hung up by the user. This is detected by off-hook detect circuit 155, which responsively de-asserts the off-hook signal on line 153. This, in turn, is detected by logic circuit 163 which responsively resets line driver 165 to its default (bypassed) state as above-described. In addition, logic circuit 163 opens switch S5 temporarily to de-couple answering machine 125 from the telephone line when the local remote-control telephone is hung up. This is done to ensure that telephone line 183 is immediately ready for the placing of an outgoing telephone call, which would not be the case if answering machine in accordance with its particular mode of operation had not yet hung up the line. When answering machine 125 re-enters its default state in accordance with its particular mode of operation (depending on the make and model of answering machine used), this will be detected by answering machine off-hook circuit 195. Logic circuit 163 then will close switch S5 and disable off-hook detect circuit 195 so that answering machine 125 is again able to pick up telephone line 183 either in response to an incoming telephone call from the telephone network, or in response to a local remote-control telephone initiating remote-control operation of the answering machine.

Figure 2:
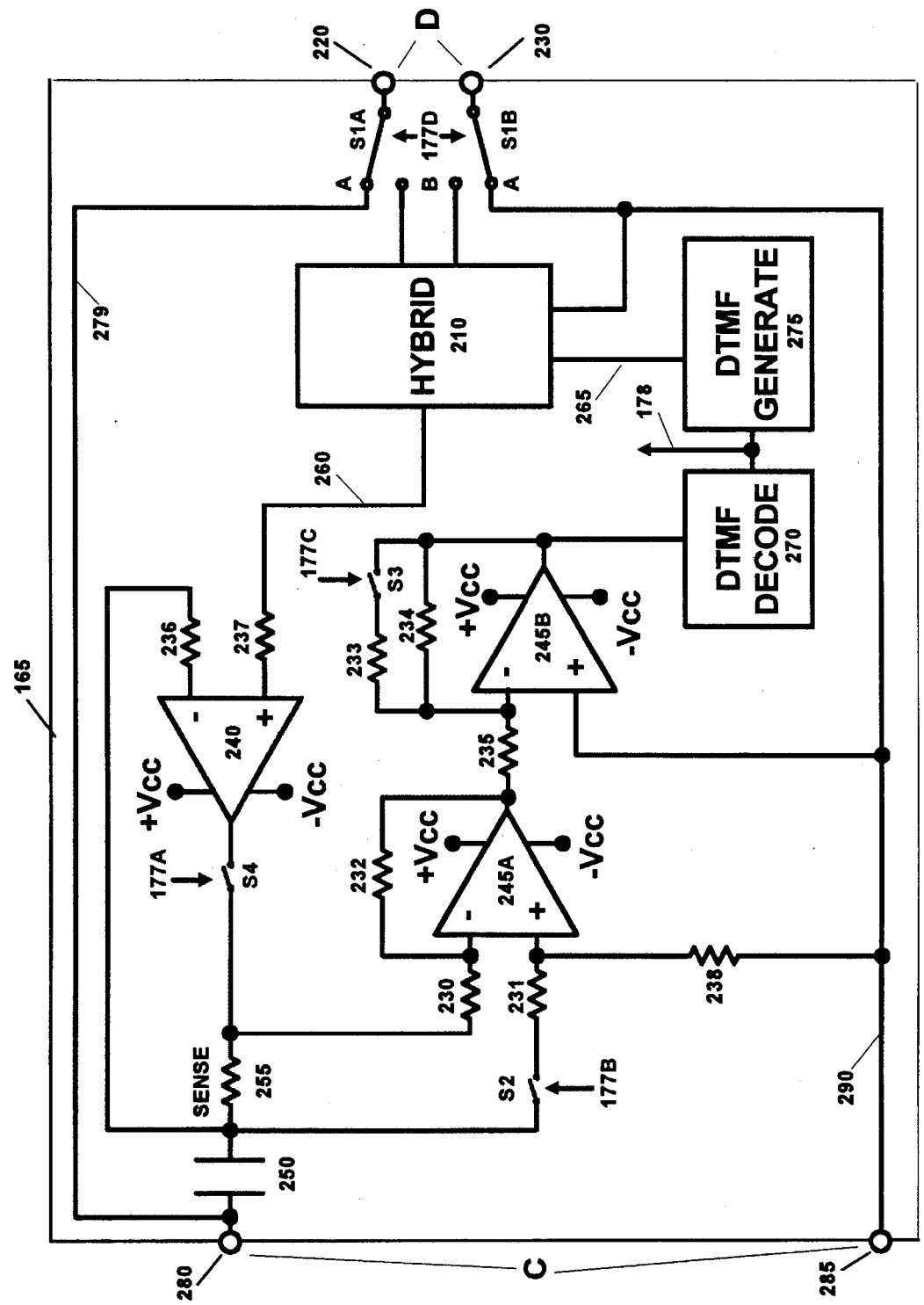
FIG. 2 is a simplified circuit diagram of an exemplary embodiment of the line driver illustrated in FIG. 1.

The operation of the apparatus of FIG. 1, as described above, can be further appreciated from FIG. 2, which illustrates an exemplary embodiment of line driver 165. As shown in FIG. 2, line driver 165 includes a pair of terminals 280 and 285 which together comprise port C (see FIG. 1). These terminals are coupled, as shown in FIG. 1, to terminal 192 via line 196 (comprising a pair of conductors), and then to the T and R conductors of telephone line 183. Coupled to terminal 280 is a first terminal of capacitor 250, the purpose of which is to block DC current sourced from telephone line 183. Coupled to the other terminal of capacitor 250 is a first terminal of sense resistor 255. The other terminal of resistor 255 is coupled to a first terminal of a normally open switch S4. Switch S4 preferably comprises a normally open relay actuated by a control signal 177A coupled to the relay's coil. Signal 177A is one of several control signals, generally denoted as 177 in FIG. 1, that are generated and coupled to line driver 165 by logic circuit 163. The other control signals, also shown in FIG. 2, are signals 177B, 177C and 177D. These respectively actuate switches S1 (comprised of double-throw switches S1A and S1B), S2 (normally open) and S3 (normally closed). While relays are preferred for switches S1–S4, it will be appreciated by persons skilled in the art that other types of switches, such as bipolar or MOS transistor switches, may be used.

The second terminal of switch S4 is coupled to the output of amplifier 240. This amplifier is powered, as shown, from a conventional positive and negative supply designated as $+V_{cc}$ and $-V_{cc}$. The negative input of differential amplifier 240 is coupled through resistor 236 to the node between resistor 255 and capacitor 250, such that resistor 255 is within the amplifier's feedback loop. The other (positive) input of amplifier 240 is coupled through resistor 237 to a primary terminal of hybrid transformer 210.

Also coupled to the first terminal of capacitor 250 (at terminal 280) is a terminal (A) of switch S1A. A second terminal (B) of switch S1A is coupled to one of the secondary terminals of hybrid 210, and a third terminal of switch S1A is coupled to first terminal 220 of port D of line driver 165. A second terminal 230 of port D is coupled to a terminal of switch S1B. Switch S1B also includes a second terminal (A) coupled to terminal 285 of port C and to another primary terminal of hybrid 210, and a third terminal (B) coupled to the other one of the secondary terminals of hybrid 210. As discussed further below, the two portions of switch S1 operate in tandem so that terminals 220 and 230 of port D are coupled either to terminals 280 and 285 of port C via terminals A of switches S1A and S1B (as shown in FIG. 2), or to the secondary of hybrid 210 via terminals B of the switches.

Amplifier 240 preferably is of a type capable of driving a significant current. While many commercially available differential amplifiers may be used for amplifier 240, preferably the amplifier comprises an LT1007 Low Noise, High Speed Precision Operational Amplifier in combination with an LT1010 Power Buffer, both available from Linear Technology Corporation of Milpitas, Calif. The LT1010 buffer increases the output capability of the LT1007 device. Persons skilled in the art will recognize that an amplifier providing more or less drive current may instead be used depending on the characteristics of the telephone line to which the line driver is coupled.

Coupled across sense resistor 255, through switch S2 and resistors 230 and 231, are the negative and positive inputs of a second amplifier 245A. This amplifier, also powered from the $+V_{cc}/-V_{cc}$ supply, preferably is an LT1007 operational amplifier. When switch S2 is closed, amplifier 245A couples the signal generated across sense resistor 255 to amplifier 245B. Resistors 230 and 231, as well as feedback resistor 232 and resistor 238, preferably are of equal value (in the range of 25k–50k ohms) so that amplifier 245A rejects common mode signals and has an overall gain of 1. Amplifier 245B, also preferably a Linear Technology LT1007 operational amplifier, is configured with resistors 233, 234, 235 and switch S3 to have an adjustable gain determined by the values of these resistors and the state (opened or closed) of switch S3. The particular values of the resistors 230–235 preferably are determined empirically in view of the considerations discussed below, and the particular other components used in line driver 165, in order to optimize performance of the circuit in a given application.

The output of amplifier 245B is coupled to the input of DTMF decode circuit 270. DTMF decode circuit 270 is a commercially available integrated circuit of the type that receives an analog DTMF signal, and outputs a 4-bit binary, signal representative of the received DTMF tones. A non-limiting example of a DTMF circuit suitable for use with the invention is the CD22204 5V Low Power Subscriber DTMF Receiver, available from Harris Semiconductor of Melbourne, Fla.

The 4-bit output of DTMF decode circuit 270 is coupled to the input of DTMF generator circuit 275, as well as to logic circuit 163 via data lines 178. DTMF generator circuit 275 is a commercially available integrated circuit that takes as its input 4 binary data bits indicative of a desired DTMF encoding, and outputs corresponding analog DTMF tones on line 265 (an example of such a circuit is the CD22859 Dual-Tone Multifrequency Tone Generator, available from Harris Semiconductor). The combination of DTMF decode circuit and DTMF generator circuit results in a DTMF signal being output on line 265 corresponding to the DTMF tones received by line driver 165 from telephone line 183. The DTMF output from DTMF generator 275 is coupled via line 265 to a third primary terminal of hybrid transformer 210.

Line driver 165 operates as follows. When controller 105 is in its default mode of operation, as previously described, logic circuit 163 causes switches S1A and S1B to be coupled to position (A), switch S3 to be closed, and switches S2 and S4 to be open. This setting of switches S1 through S4 causes amplifier block 240 of line driver 165 to be disabled and bypassed. Signals thus pass bi-directionally between ports C and D via lines 279 and 290. Amplifiers 245A and 245B, however, continue to be enabled for amplifying signals appearing across port C. This occurs because the negative input of amplifier 245A is coupled to terminal 280 through resistor 230, resistor 255 and capacitor 250, and the amplifier's positive input is coupled to terminal 285 through resistor 238.

When one of local remote-control telephones 160A–160C goes off-hook without the presence of a ringing signal on telephone line 183, as previously described, logic circuit 163 via control lines 177 maintains switches S1–S4 in the above-described states. Thus, line driver 165 continues to detect DTMF commands transmitted by any of telephones 160A–160C. This is because DTMF signals appearing on telephone line 183 are coupled to amplifier 245A, and then to amplifier 245B. These signals are amplified by amplifier 245B, coupled to DTMF decode circuit 270, and then output in binary form to logic circuit 163.

If a sequence of DTMF signals corresponding to a predetermined local remote-control security code is received, as determined by logic circuit 163, the logic circuit places controller 105 into its local remote-control mode of operation. As previously described, this results in the generation of a synthesized ringing signal to answering machine 125.

When off-hook detect circuit 195 signals that answering machine 125 has picked up line 198 in response to the synthesized ringing signal, logic circuit 163 opens switch S3 via control line 177C, closes switches S2 and S4 via control lines 177B and 177A, respectively, and actuates switch S1 to couple port D to the secondary of hybrid 210 (position B). This setting of switches S1–S4 fully enables line driver 165. With the closing of switch S4 and the actuation of switch S1 into position B, audio signals generated by answering machine 125 are transmitted by amplifier 240 of line driver 165 to telephone line 183. Thus, messages recorded by answering machine 125 may now be transmitted to and heard through any of local remote-control telephones 160A–160C. Simultaneously, amplifier 240 via the feedback path formed from the node between capacitor 250 and resistor 255 to the amplifier's negative input, forces the AC impedance at the node between capacitor 250 and sense resistor 255—and, hence, of telephone line 183—to be at or close to zero. As a consequence of this, while audio message signals transmitted from answering machine 125 to telephone line 183 may be heard through any of local remote-control telephones 160A–160C, supervisory tones, messages and other audio signals transmitted to telephone line 183 from the Central Office telephone network will be substantially reduced in volume. This reduction substantially reduces interference that would otherwise be caused by these Central Office tones and signals, and that would be heard through local remote-control telephones 160A–160C while the answering machine's recorded messages are being played.

Switch S2 and sense resistor 255 are present in the circuit to ensure that answering machine 125 can be controlled by DTMF signals transmitted by local remote-control telephone 160 even while amplifier 240 is decreasing the magnitude on telephone line 183 of analog signals transmitted from sources other than answering machine 125. Because sense resistor 255 is located within the feedback loop of amplifier 240, AC signals transmitted onto telephone line 183 (e.g., from telephones 160A–160C or the Central Office) will appear across resistor 255 even though these signals are highly attenuated between terminals 280 and 285. With switch S2 closed, amplifier 245A couples these signals appearing across resistor 255 to amplifier 245B, rather than the attenuated signals appearing across terminals 280 and 285. As a result, even while the AC impedance of telephone line 183 is being forced to be at or close to zero, causing a reduction in the amplitude of AC signals transmitted onto telephone line 283, DTMF signals transmitted by telephones 160A–160C will appear across resistor 255, will be amplified by amplifiers 245A and 245B, and will be coupled to DTMF decode circuit 270. These DTMF signals thus may be used to control controller 105, and answering machine 125, even while signals are being attenuated on telephone line 183 by amplifier 240. The binary output of DTMF decode circuit 270 is coupled to DTMF generator circuit 275, which re-creates received DTMF tones on line 265 for coupling to answering machine through hybrid 210. Switch S3 is present in the circuit in order to adjust the gain of the amplifier block 245A/245B, and more particularly to increase the gain of the block when DTMF signals are being sensed across resistor 255 and to decrease the block's gain when DTMF signals are being sensed across terminals 280 and 285.

The purpose of decoding and then generating received DTMF signals, using DTMF decoder 270 cascaded with DTMF generator 275, is to avoid coupling to hybrid 210 signals other than DTMF signals that might appear across sense resistor 255 (such as signals transmitted from the Central Office). The concern is to prevent non-DTMF signals output by amplifier 245B from being turned around by hybrid 210, and transmitted back onto the telephone line to interfere with messages being played back by answering machine 125. The combination of DTMF decode circuit 270 and DTMF generator circuit 275 ensures that this cannot happen. There are, of course, other ways of preventing such interference. For instance, persons skilled in the art will appreciate that the DTMF output of amplifier 245B could be directly coupled to hybrid 210, rather than through DTMF decoder 270 and DTMF generator 275, by appropriate selection of hybrid 210. In such a case, hybrid 210 would be constructed to prevent substantial transmission onto line 260 of signals coupled to hybrid 210 from line 265.

The result of all of the foregoing is that controller 105 allows messages to be retrieved from answering machine 125 using any local remote-control telephone that is coupled to the same telephone line to which the answering machine is coupled, and in parallel with the answering machine. Moreover, these messages may be retrieved without undesirable audio interference caused by other signals (such as supervisory tones and audio messages) that might be transmitted to the telephone line by the Central Office. Additional circuitry to block such interfering signals, placed in series between the telephone network and the telephone line to which the local remote-control telephone or answering machine are coupled, is not required.

Figure 3:
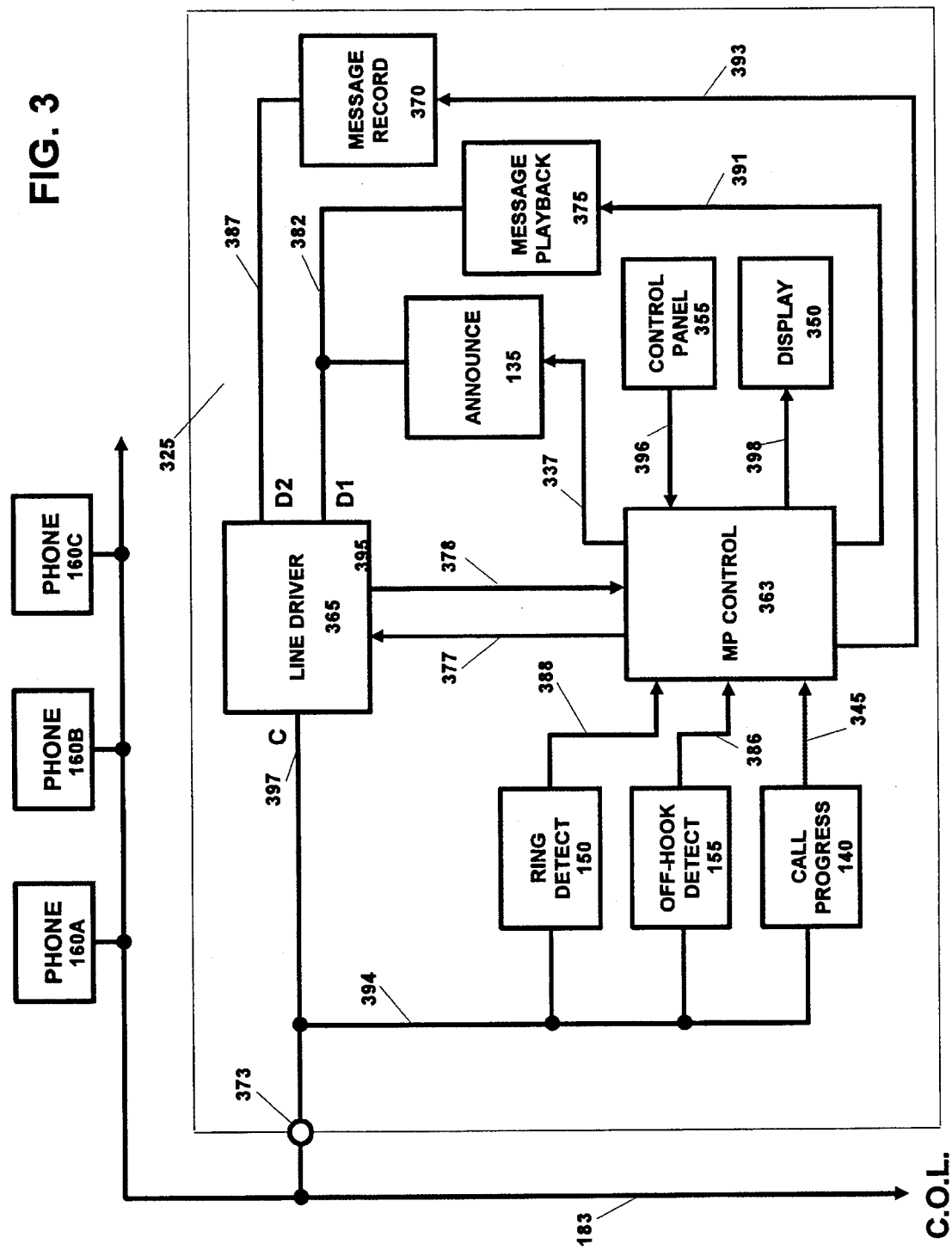
FIG. 3 is a block diagram of an alternative embodiment of the present invention placed integrally within an improved telephone answering machine.

Turning now to FIG. 3, an alternative embodiment of the invention is shown in which local remote-control circuitry has been embodied integrally within an answering machine 325. Answering machine 325 is coupled to telephone line 183 via RJ11 terminal 373 such that it is in parallel with local remote-control telephones 160A–160C. Telephone line 183, in turn, is coupled to a Central Office ("C.O.L.") via a telephone network (not shown) as in FIG. 1. Answering machine 325 includes conventional circuitry for recording (message record block 370) and playing back (message playback block 375) incoming and greeting messages. Also included within answering machine 325 is a microprocessor 363 (which, alternatively, could be hard-wired logic) for controlling and synchronizing the answering machine's operations. Answering machine 325 further includes a ring detect circuit 150 for detecting the presence of a tinging signal indicative of an incoming telephone call, an off-hook detect circuit 155 for detecting when telephone line 183 has gone off-hook, a display 350 (which includes, for example, a received message counter and various indicator lights for informing the user of the status of the answering machine), a control panel 355 (which includes, for example, pushbuttons for operating the answering machine's various functions such as record a greeting message, play back recorded messages, set date and time for purposes of time-stamping recorded messages, fast-forward, rewind and stop), and line driver 365 (having three ports C, D1 and D2). Also optionally included within answering machine 325 is call progress circuit 140 for detecting different call progress tones appearing on telephone line 183, and an announcement circuit 135.

In its default state of operation, answering machine 325 appears to a user to operate in a manner similar to a conventional answering machine. Thus, if local remote telephones 160A–160C are on-hook and a ringing signal appears on line 183 indicative of an incoming telephone call from another telephone line, this tinging signal will be detected by ring detector 150 which will responsively output a ting signal to microprocessor 363 via line 388. After a predetermined number of rings (typically, but not necessarily, one ring), microprocessor 363 will cause answering machine 325 to "answer" the call by a control signal coupled to line driver 365 via control lines 377, as more particularly discussed below with respect to FIG. 4. When answering machine 325 picks up the line in response to the ringing signal, microprocessor 363 via line 391 optionally commands the playback of a greeting message. In its default state of operation, line driver 365 is disabled via control signals coupled from microprocessor 363 via control lines 377. The greeting message, therefore, passes through line driver 365 to telephone line 183 (between ports D1 and C), and is coupled to telephone line 183 for transmission to the telephone being used by the caller. Following playback of the greeting message, microprocessor 363 commands message record circuit 370 (by a control signal coupled over line 393) to record the caller's message. The message passes through line driver 365 from port C to port D2, and to message record circuit 370 over line 387. After the message has been recorded, microprocessor 363 causes answering machine 325 to hang up the line by control signals sent to line driver 365 over control lines 377.

In the above-described situation, the caller also can operate answering machine 325 by remote control using DTMF signals transmitted from his or her remote remote-control telephone (not shown). DTMF signals are coupled to line driver 365, where they are detected by a DTMF decode circuit (discussed below in the context of FIG. 4). Binary signals indicative of received DTMF signals are coupled to microprocessor 363 via data lines 378. Responsive to the receipt of a predetermined security code followed by predetermined remote-control commands signals, microprocessor 363 controls the operation of the various circuits 370 and 375 of answering machine 325 in a conventional manner to play back recorded messages to the caller, to record a new greeting message, and so forth. Additionally, optional announcement circuit 135 is actuated via control line 337 to generate an announcement to the remote remote-control telephone (e.g., stating the number of messages available to be retrieved).

Answering machine 325 of FIG. 3 is also capable of being placed in a second (local remote-control) mode of operation so that its various operations can be controlled by DTMF signals transmitted from any of local remote-control telephones 160A–160C. This second mode of operation is entered when any of telephones 160A–160C: (1) goes off-hook at a time when no ringing is (or recently has been) present on telephone line 183 (or if call progress circuit 140 fails to detect within a predetermined period of time the presence of a dial tone), and (2) transmits a predetermined DTMF security code to answering machine 325 within a predetermined period of time after the local remote control telephone has gone off-hook. When these events occur, line driver 365 is enabled to couple the answering machine to telephone line 183 while reducing the magnitude of undesirable audio signals transmitted from the Central Office in order to reduce interference between these signals and the answering machine messages being played back through the local remote-control telephone. Remote-control DTMF signals transmitted from any of local remote-control telephones 160A–160C are detected by line driver 365 and are coupled, in binary form, to microprocessor 363 to effect remote operation of the answering machine. Using these remote-control signals, any of local remote-control telephones 160A–160C may retrieve messages that have been recorded by the answering machine. The other functions of answering machine 325 may be remotely controlled as well. The user of a local remote-control telephone thus may change the greeting message, record his or her own message for another member of the household, etc. When local remote-control telephone 160 is hung up, this is detected by off-hook detect circuit 155. In response, microprocessor 363 resets line driver 365 so that answering machine 325 is ready to answer a telephone call and record a message from a remote remote-control telephone.

Figure 4:
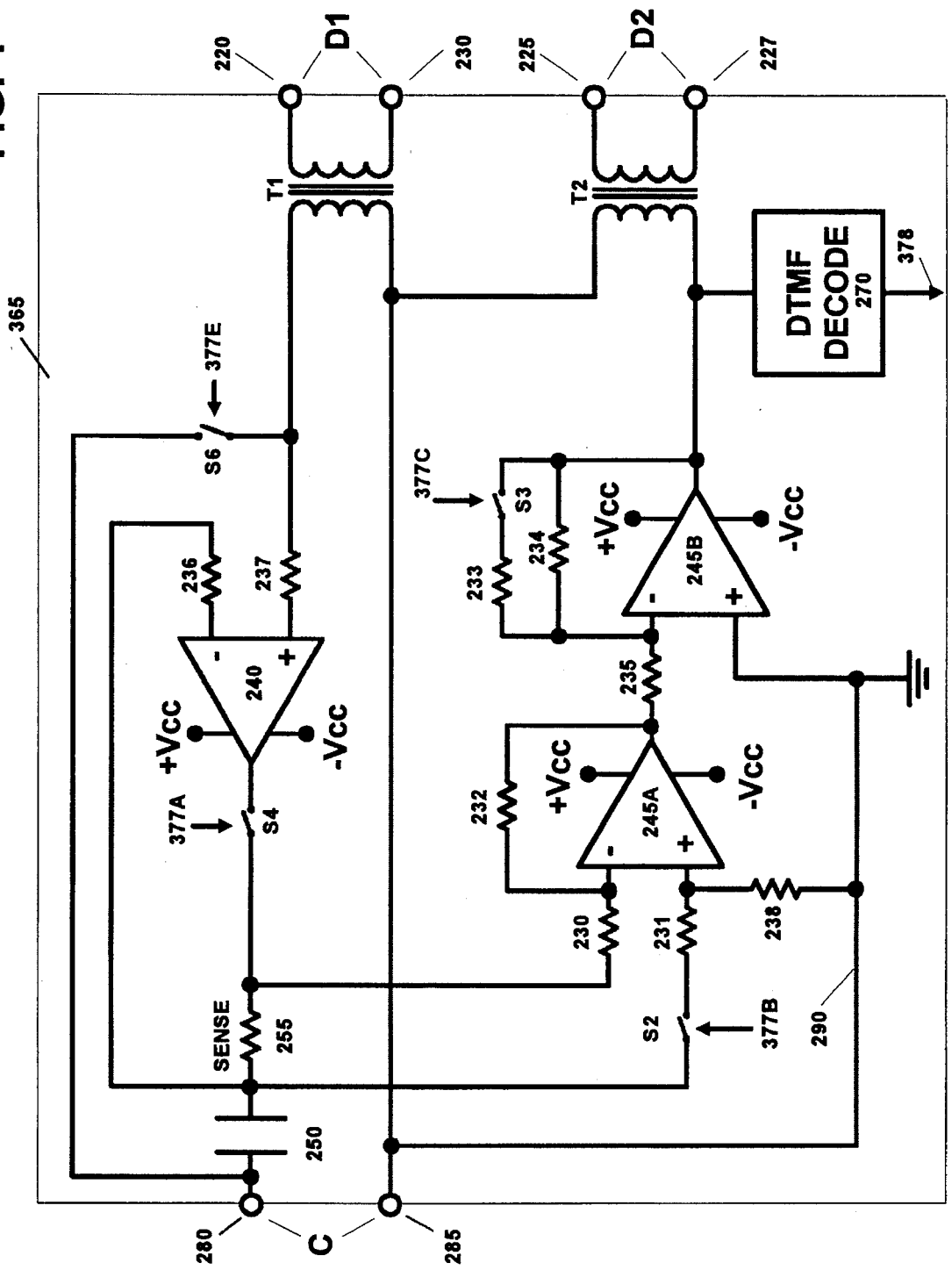
FIG. 4 is a simplified circuit diagram of an exemplary embodiment of the line driver illustrated in FIG. 3.

The operation of answering machine 325, as described above, may be further understood from considering the circuitry of line driver 365, which is shown in greater detail in FIG. 4. Line driver 365 is similar to line driver 165 of FIG. 2, except that (1) DTMF generator circuit 275 has been deleted, (2) hybrid 210 has been replaced by transformers T1 and T2 coupled, respectively, to ports D1 (terminals 220 and 230) and D2 (terminals 225 and 227), and (3) switch S1 has been deleted and switch S6 has been added.

In the default mode of operation of answering machine 325, microprocessor 363 causes switch S3 to be closed (to decrease the overall gain of amplifier 245B), and switches S2, S4 and S6 to be open. With switch S4 open, amplifier 240 is disabled from coupling signals to port C or from reducing the AC impedance of telephone line 183. With switch S6 open, answering machine 325 is on-hook.

With answering machine 325 in the foregoing state, a ringing signal will be detected by ring detect circuit 150 (FIG. 3) if a telephone call is placed to telephone line 183 from a remote remote-control telephone. In response to this, microprocessor 363 via control line 377E closes switch S6. The closing of switch S6 allows a DC current sourced by the Central Office to flow through the primary of transformer T1, which in turn causes answering machine 365 to be recognized at the Central Office as having gone off-hook. Microprocessor 363 then controls the operation of answering machine 365 in a conventional manner, as discussed above, optionally to play a greeting message. Audio signals representative of the greeting message pass through line driver 365 from port D1 to port C (through switch S6), and from there to telephone line 283. Audio signals representing messages to be recorded by the answering machine that are transmitted from the remote remote-control telephone enter line driver 365 through port C. These signals appearing across terminals 280 and 285 of port C are coupled to amplifier 245A (because switch S2 is open), are output from amplifier 245A to amplifier 245B where they are amplified, and are coupled from the output of amplifier 245B to the primary of transformer T2. Transformer T2, in turn, couples these incoming message signals to port D2 (comprised of terminals 225 and 227), which is coupled to recorder circuit 370 via the pair of lines denoted as 387 in FIG. 3.

Also because switch S2 is open, DTMF signals appearing across terminals 280 and 285 are amplified by amplifiers 245A and 245B. These DTMF signals are detected and decoded by DTMF decode circuit 270, which outputs corresponding binary data signals on bus 378. These data signals are coupled to microprocessor 363 (see FIG. 3), and thus enable answering machine 325 to be remotely controlled by the remote remote-control telephone in a conventional manner.

When answering machine 325 has finished recording a message or has otherwise completed its operations, microprocessor 363 causes switch S6 to open. This has the effect of hanging up the line.

Alternatively, answering machine 365 may be operated in a local remote-control mode. This is accomplished, as previously described, by taking any of local remote-control telephones 160A–160C off hook at a time when no ringing signal is or recently has been present on the line (or, if call progress circuit 140 is used, a dial tone is detected), and by transmitting from the local remote-control telephone a predetermined DTMF security code (such as ###). When the local remote-control telephone is taken off hook, as detected by off-hook detect circuit 155, switch S3 is closed and switches S2, S4 and S6 are open. As before described, the DTMF signals are detected across terminals 280 and 285, are decoded by DTMF decode circuit 270, and are coupled in binary form to microprocessor 363. In response to receipt of the security code within a predetermined period of time after the telephone has gone off-hook, microprocessor 363 causes switch S3 to open (increasing the gain of the amplifier block comprising amplifier 245B), and switches S2 and S4 to closed (switch S6 remains open). The closing of switches S2 and S4 enables amplifier 240, and causes signals appearing across resistor 255 (rather than those appearing across terminals 280 and 285) to be coupled to amplifier 245A. Amplifier 240 now decreases the magnitude of AC signals transmitted onto telephone line 183 from sources other than answering machine 325 in order to reduce interference caused by these signals with messages to be played back through the local remote-control telephone, while coupling the output of message playback circuit 375 to the telephone line for transmission to the local remote-control telephone. DTMF signals transmitted from the local remote-control telephone appear across sense resistor 255, are coupled to DTMF decode circuit 270 by amplifiers 245A and 245B, are decoded by DTMF decode circuit 270, and are coupled to microprocessor 363 in binary form all as previously described. Thus, any local remote-control telephone 160A–160C may control answering machine 325 to retrieve recorded messages in a manner similar to the apparatus of FIGS. 1 and 2.

Thus, an improvement for a telephone answering machine controller has been disclosed that enables the answering machine to be remotely controlled by any DTMF-capable remote remote-control telephone, as well as by any local remote-control telephone. The local remote-control telephone may be coupled in parallel with the answering machine and to the same telephone line to which the answering machine is coupled, and at a location physically remote from the answer machine. Because the invention reduces interference with messages being played back through the local remote-control telephone caused by signals received from the Central Office, it is not necessary to place other circuitry (such as a PBX, Key Telephone System, or other controller) in series between the telephone line and the Central Office telephone network.

Persons of ordinary skill in the art will recognize that the telephone answering machine local remote-control adapter of the present invention could be implemented using circuit configurations other than those shown and discussed above. For example, digital signal cancellation circuitry and techniques could be used rather than the analog circuitry disclosed herein. All such modifications are within the scope of the present invention, which is limited only by the claims which follow.

What is claimed is:

1. A telephone answering apparatus for coupling to a first telephone line that is coupled to a telephone network, said first telephone line having a first telephone coupled thereto in parallel with said telephone answering apparatus, said telephone answering apparatus comprising:

means for recording a message transmitted over said telephone network from a second telephone coupled to a second telephone line;

means for receiving a command signal transmitted from said first telephone;

means responsive to said received command signal for coupling the recorded message to said first telephone line to cause the recorded message to be played back and heard through said first telephone; and means for reducing audible interference with said recorded message caused by signals received on said first telephone line from said telephone network while said recorded message is being played back.

2. The apparatus of claim 1, wherein said means for reducing audible interference comprises a means for decreasing the magnitude of said signals so that the volume of said signals as heard through said first telephone relative to the volume of said played back recorded message is reduced.

3. A circuit for coupling a telephone answering machine to a telephone line at a first location along the telephone line, said telephone line for receiving audio signals transmitted from a telephone network, and said telephone answering machine for playing a recorded message, the circuit comprising:

means for coupling the played recorded message to said telephone line so that said played recorded message is heard through a telephone coupled to said telephone line in parallel with said answering machine and at a second location along said telephone line remote from said first location; and means for reducing audible interference with said played recorded message heard through said telephone caused by audio signals received on said telephone line from said telephone network while said played recorded message is being played.

4. The apparatus of claim 3, wherein said means for reducing audible interference comprises a means for decreasing the magnitude of said audio signals appearing on said telephone line so that the volume of said audio signals as heard through said telephone relative to the volume of said played recorded message is reduced.

5. A apparatus adapted to be coupled between a telephone answering machine and a first telephone line at a first location along the first telephone line, said telephone answering machine including circuitry for going off-hook, for recording a message transmitted over a telephone network from a remote-remote telephone coupled to a second telephone line, and for enabling remote control operation of said answering machine by command signals transmitted from said remote-remote telephone, said apparatus comprising:

means for receiving command signals transmitted from a local-remote telephone coupled to said first telephone line;

means responsive to a first command signal transmitted from said local-remote telephone for causing said answering machine to go off-hook;

means responsive to a second command signal transmitted from said local-remote telephone for causing the answering machine to play back the recorded message over the first telephone line to the local-remote telephone so that the recorded message when played back is heard through the local-remote telephone; and means for reducing interference heard through the local-remote telephone between the recorded message being played back and audio signals transmitted from said telephone network that appear on said first telephone line during said play back.

6. An apparatus for improving the operation of a telephone answering machine, said answering machine being of a type that is for coupling to a first telephone line in parallel with a first telephone coupled to said first telephone line, and said answering machine further being of a type that is operable in a first mode of operation, (1) to record a message transmitted to the answering machine over a telephone network, and (2) to be remotely controlled by command signals transmitted to the answering machine over said telephone network from a second telephone at least to cause said message recorded by said answering machine to be played back and coupled to said first telephone line for transmission via said telephone network to said second telephone, said apparatus comprising:

first means for enabling said answering machine to operate in said first mode of operation, and second means for enabling said answering machine to operate in a second mode of operation, said second means including:
  (A) a circuit for enabling said telephone answering machine to be remotely controlled, by command signals transmitted to the answering machine from said first telephone, at least to play back said recorded message and to couple said played back recorded message to said first telephone line so that said played back recorded message is heard through said first telephone, and
  (B) a circuit for reducing audible interference between the played back recorded message being played back through said first telephone and audio signals transmitted from said telephone network to said first telephone line during said play back.

7. A circuit for coupling a telephone answering machine to a first telephone line at a first location along said first telephone line, said first telephone line for having a plurality of first telephones coupled thereto in parallel with said answering machine and at different locations along said first telephone line remote from said first location, said answering machine further for recording a message transmitted over a telephone network to said first telephone line, and said answering machine additionally for playing back a recorded message over said telephone network, to be heard through a second telephone coupled to said telephone network by a second telephone line, in response to remote control command signals transmitted from said second telephone over said telephone network, said circuit comprising:

means for enabling said answering machine to play back said recorded message in response to a remote control command signal transmitted by any of said plurality of first telephones;

means for coupling the played back recorded message to said first telephone line so that the played back recorded message may be heard through any of said plurality of first telephones; and means for reducing audible interference with the played back recorded message heard through any of said plurality of first telephones caused by audio signals transmitted from said telephone network during playback of the played back recored message.

8. A circuit for coupling a telephone answering machine to a first telephone line at a first location along said first telephone line, said first telephone line for having a plurality of first telephones coupled thereto in parallel with said answering machine and at different locations along said first telephone line remote from said first location, said answering machine further for recording a message transmitted over a telephone network to said first telephone line from a second telephone coupled to a second telephone line, said answering machine further for being remotely controlled by command signals transmitted thereto over said first telephone line at least to play back said recorded message, said circuit comprising:

means for coupling said recorded message when played back to said first telephone line to enable said played back recorded message to be heard through any of said plurality of first telephones;

means for reducing audio signals transmitted onto said first telephone line from a source other than said answering machine while said recorded message is being played back, in order to reduce audible interference between said audio signals and said played back recorded message being heard through any of said plurality of first telephone; and means for responding to command signals transmitted by any of said plurality of first telephones to enable said answering machine to be remotely controlled by said command signals while said audio signals are being reduced.

9. A method for use by a telephone answering apparatus, said apparatus for coupling to a first telephone line that is coupled to a telephone network, said first telephone line having a first telephone coupled thereto in parallel with said apparatus, said method comprising the steps of:

recording a message transmitted over said telephone network from a second telephone coupled to a second telephone line;

receiving command signals transmitted from said first telephone;

coupling the recorded message to said first telephone line in response to a received command signal to cause the recorded message to be played back through said first telephone; and reducing audible interference with said played back recorded message caused by audio signals received on said first telephone line from said telephone network while said recorded message is being played back.

10. The method of claim 9, wherein said reducing step comprises decreasing the magnitude of said audio signals so that the volume of said audio signals as heard through said first telephone relative to the volume of said played back recorded message is reduced.

11. A method for use with a telephone answering machine coupled to a telephone line at a first location along the telephone line, said telephone line being for receiving audio signals transmitted from a telephone network, and said telephone answering machine being for playing a recorded message, the circuit comprising:

coupling the recorded message when played back to said telephone line so that said message is heard through a telephone coupled to said telephone line in parallel with said answering machine; and reducing audible interference with said recorded message heard through said telephone caused by audio signals received on said telephone line from said telephone network while said recorded message is being played back.

12. The method of claim 11, wherein said reducing step comprises decreasing the magnitude of said audio signals appearing on said telephone line so that the volume of said audio signals as heard through said first telephone relative to the volume of said played back recorded message is reduced.

13. A method for coupling a telephone answering machine to a first telephone line at a first location along the first telephone line, said answering machine including circuitry for going off-hook, for recording a message transmitted over a telephone network from a remote-remote telephone coupled to a second telephone line, and for enabling remote control operation of said answering machine by command signals transmitted from said remote-remote telephone, said method comprising the steps of:

receiving command signals transmitted from a local-remote telephone coupled to said first telephone line;

causing said answering machine to go off-hook in response to a first command signal transmitted from said local-remote telephone;

responsive to a second command signal transmitted from said local-remote telephone, causing the answering machine to play back the recorded message over the first telephone line to the local-remote telephone so that the recorded message when played back is heard through the local-remote telephone; and reducing interference between the recorded message being played back through the local-remote telephone and audio signals transmitted from said telephone network that appear on said first telephone line during said play back.

14. An improved method for operating a telephone answering machine, said answering machine being of a type that is for coupling to a first telephone line in parallel with a first telephone coupled to said telephone line, and said answering machine further being of a type that is operable, in a first mode of operation, (1) to record a message transmitted to the answering machine over a telephone network, and (2) to be remotely controlled by command signals transmitted to the answering machine over said telephone network from a second telephone at least to cause said message recorded by said answering machine to be played back and coupled to said first telephone line for transmission via said telephone network to said second telephone, said improved method comprising the steps of:

enabling said answering machine to operate in said first mode of operation, and enabling said answering machine to operate in a second mode of operation, said second mode including the steps of:

(A) enabling said answering machine to be remotely controlled, by command signals transmitted to the answering machine from said first telephone, to play back said recorded message and to couple said played back recorded message to said first telephone line so that said played back recorded message is heard through said first telephone, and (B) reducing audible interference between the played back recorded message being played back through said first telephone and audio signals transmitted from said telephone network to said first telephone line during said play back.

15. A method for use by a telephone answering machine coupled to a first telephone line at a first location along said first telephone line, said first telephone line for having a plurality of first telephones coupled thereto in parallel with said answering machine and at different locations along said first telephone line remote from said first location, said answering machine further for recording a message transmitted over a telephone network to said first telephone line, and said answering machine additionally for playing back a recorded message over said telephone network, to be heard through a second telephone coupled to said telephone network by a second telephone line, in response to remote control command signals transmitted from said second telephone over said telephone network, said method comprising:

enabling said answering machine to play back said recorded message in response to a remote control command signal transmitted by any of said plurality of first telephones;

coupling the played back recorded message to said first telephone line so that the played back recorded message is heard through any of said plurality of first telephones; and reducing audible interference with the played back recorded message heard through any of said plurality of first telephones caused by audio signals transmitted from said telephone network during playback of the played back recorded message.

16. A method for use with a telephone answering machine coupled to a first telephone line at a first location along said first telephone line, said first telephone line for having a plurality of first telephones coupled thereto in parallel with said answering machine and at different locations along said first telephone line remote from said first location, said answering machine for recording a message transmitted over a telephone network to said first telephone line from a second telephone coupled to a second telephone line, said answering machine further for being remotely controlled by command signals transmitted thereto it over said first telephone line at least to play back said recorded message, said method comprising:

coupling said recorded message when played back to said first telephone line to enable said played back recorded message to be heard through any of said plurality of first telephones;

reducing audio signals transmitted onto said first telephone line from a source other than said answering machine while said recorded message is being played back, in order to reduce audible interference between said audio signals and said played back recorded message being heard through any of said plurality of first telephones; and responding to command signals transmitted by any of said plurality of first telephones while said audio signals are being reduced whereby said answering machine is remotely controlled by said command signals while said audio signals are being reduced.

* * * * *